United States Patent [19]

Negita et al.

[11] 3,885,229

[45] May 20, 1975

[54] DOCUMENT SCANNING APPARATUS

[75] Inventors: Michihiko Negita; Yoshiyasu Kikuchi, both of Tokyo, Japan

[73] Assignee: Nippon Electric Company Limited, Tokyo, Japan

[22] Filed: Oct. 25, 1973

[21] Appl. No.: 409,540

[30] Foreign Application Priority Data

Oct. 28, 1972 Japan .............................. 47-108189
Oct. 28, 1972 Japan .............................. 47-108190

[52] U.S. Cl. ................ 340/146.3 H; 340/146.3 AH
[51] Int. Cl. ............................................. G06k 9/04
[58] Field of Search ........... 340/146.3 H, 146.3 AH

[56] References Cited

UNITED STATES PATENTS

| | | | |
|---|---|---|---|
| 3,337,766 | 8/1967 | Malaby | 340/146.3 AH |
| 3,458,688 | 7/1969 | Garry | 340/146.3 H |
| 3,539,993 | 11/1970 | Hardin | 340/146.3 H |
| 3,582,886 | 6/1971 | Hardin | 340/146.3 AH |
| 3,715,722 | 2/1973 | Hall | 340/146.3 H |

*Primary Examiner*—Gareth D. Shaw
*Assistant Examiner*—Robert F. Gnuse
*Attorney, Agent, or Firm*—Sughrue, Rothwell, Mion, Zinn & Macpeak

[57] ABSTRACT

A scanning apparatus for use in a character recognition system is disclosed wherein moving documents are stopped for scanning at a read station. Since a stopped document may not be precisely located for scanning a character on the document, the scanning apparatus defects both the positional and tilt errors of the document to generate corrected positional data for correct scanning of the character on the document. This is accomplished by the scanning apparatus detecting a reference mark and a tilt mark on the document. The detected data is stored as detected positional data, and when a character on the document is scanned, the detected positional data is used to determine an absolute positional data of the scanning start point for which the document stopping positional and tilt errors are corrected.

7 Claims, 14 Drawing Figures

DOCUMENT SCANNING APPARATUS

BACKGROUND OF THE INVENTION

1. Field of the Invention

The present invention relates to a scanning apparatus capable of temporarily stopping a supplied document, and reading information on the document while it is stopped. The invention relates more particularly to a scanning apparatus capable of operation wherein a reference mark and a tilt mark provided at arbitrary positions on the document or an end of the document is detected and wherein the document stopping position error and the error due to the tilt of the document are corrected through a scanning position coordinate whereby the information on the document is accurately scanned with respect to position.

2. Description of the Problem

In general, it is very difficult to stop a supplied document at an identical position with accuracy. For this reason, the scanning apparatus used in a character recognition system is required to correct the error due to deviation in the stopping position of the document and the error due to the tilt of the document.

SUMMARY OF THE INVENTION

It is, therefore, one object of this invention to provide a scanning apparatus used in a character recognition system, which is capable of operation wherein the position of a reference mark provided on the document is detected by scanning, the detected data is stored as a detected positional data, and when a character on the document is scanned, the detected positional data of the reference mark is added to the positional data of the reference mark relative to the scanning start point (or the scanning end point) whereby determining an absolute positional data of the scanning start point (or the scanning end point) for which the document stopping position error is corrected, and thus the scanning operation is carried out according to the absolute positional data.

Another object of the invention is to provide a scanning apparatus used in a character recognition system, which is capable of operation wherein an arbitrary one of reference marks disposed in four directions at arbitrary positions on the document is detected according to approximate positional data and shape data of the reference mark supplied from an external device such as central processor, whereby the document design is simplified.

Still another object of the invention is to provide a scanning apparatus used in a character recognition system, which is capable of operation wherein all the positional data are digitized to permit positional data to be changed by digital circuits when the present positioned data is changed in relation to scanning or determination of the scanning start point (or the scanning end point) for the detection of the position of the reference mark.

Another object of the invention is to provide a scanning apparatus used in a character recognition system, which uses integrated circuits (IC's) and large scale integrated circuits (LSI's) and the like for the digital circuit thus considerably lowering the cost of the circuit compared with the analog circuit and thereby simplifying the check and maintenance of the apparatus.

A further object of the invention is to provide a document scanning apparatus wherein a tilt mark is disposed on the document in addition to the reference mark, the degree of the tilt of the document is detected according to the coordinate difference between the reference mark and the tilt mark, and the information on the document is scanned on the basis of the scanning position coordinate for which the error due to the tilt of the document is corrected.

Another object of the invention is to provide a scanning apparatus capable of properly correcting the error related to the document even in a case where the reference mark, tilt mark and/or the like printed on the document involves the so-called copying deviation relative to the document.

BRIEF DESCRIPTION OF THE DRAWINGS

The present invention will be now described in detail in conjunction with the accompanying drawings.

DESCRIPTION OF THE PREFERRED EMBODIMENT

Figure 1:
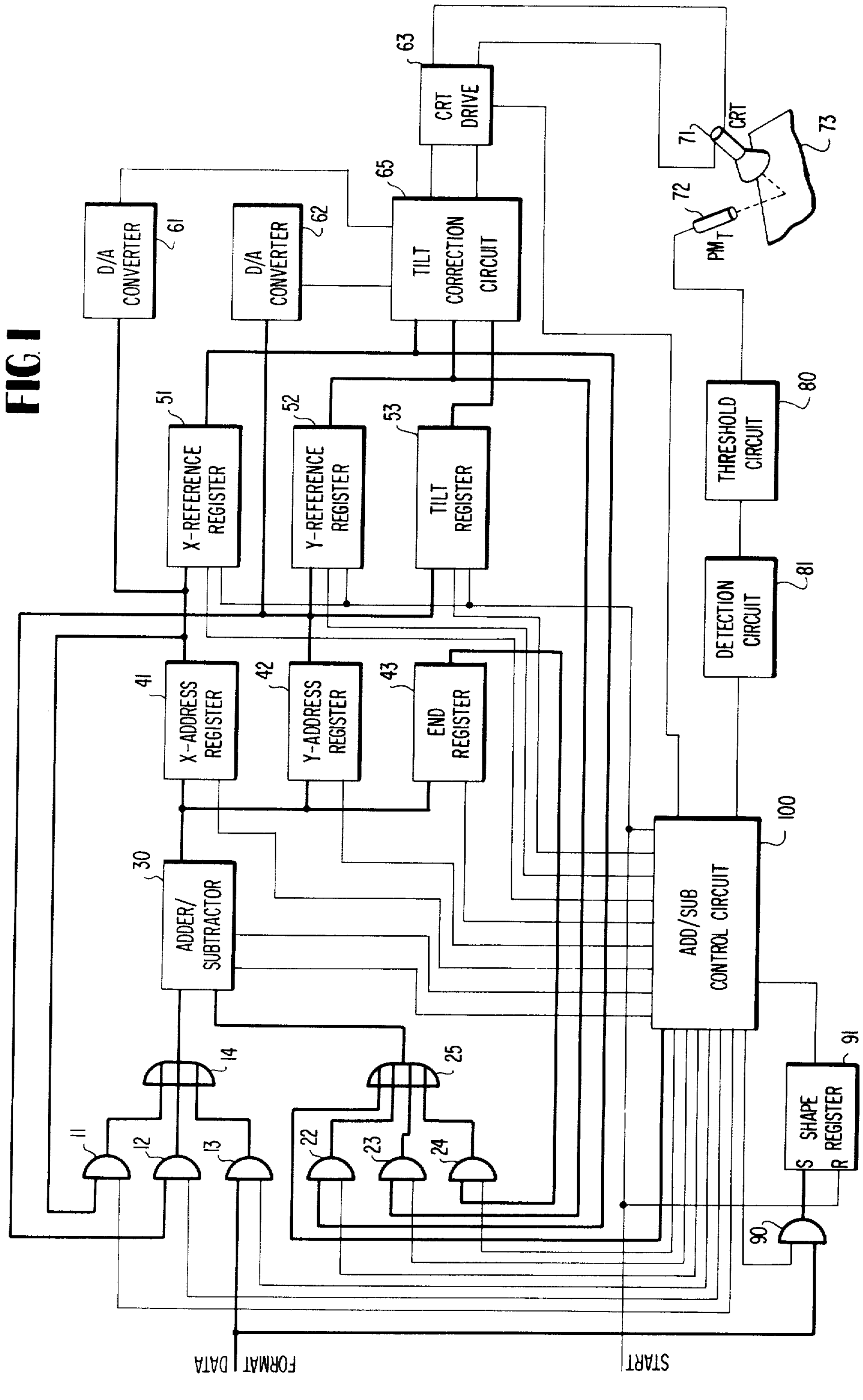
FIG. 1 shows a block diagram of one embodiment of the invention.

In FIG. 1, a document 73 is located below a cathode-ray tube (CRT) 71. The scanning beam of the CRT 71 is driven when the document is in its stop position whereby the position of the document is defined and its positioning is electronically controlled. The CRT 71 is driven by a CRT drive circuit 63 whereby its scanning beam is deflected to scan the positions of a reference mark and of a tilt mark on the document 73. The scanning beam on the document is reflected and received by a photomultiplier tube 72. This tube generates an output signal according to the state of the reference mark or the tilt mark. This output signal is supplied to an addition and subtraction control circuit 100 through a threshold circuit 80 and a detection circuit 81. The circuit 100 generates control data for controlling related circuits and performs control operations as will be described later.

Figures 7, 8, 9:
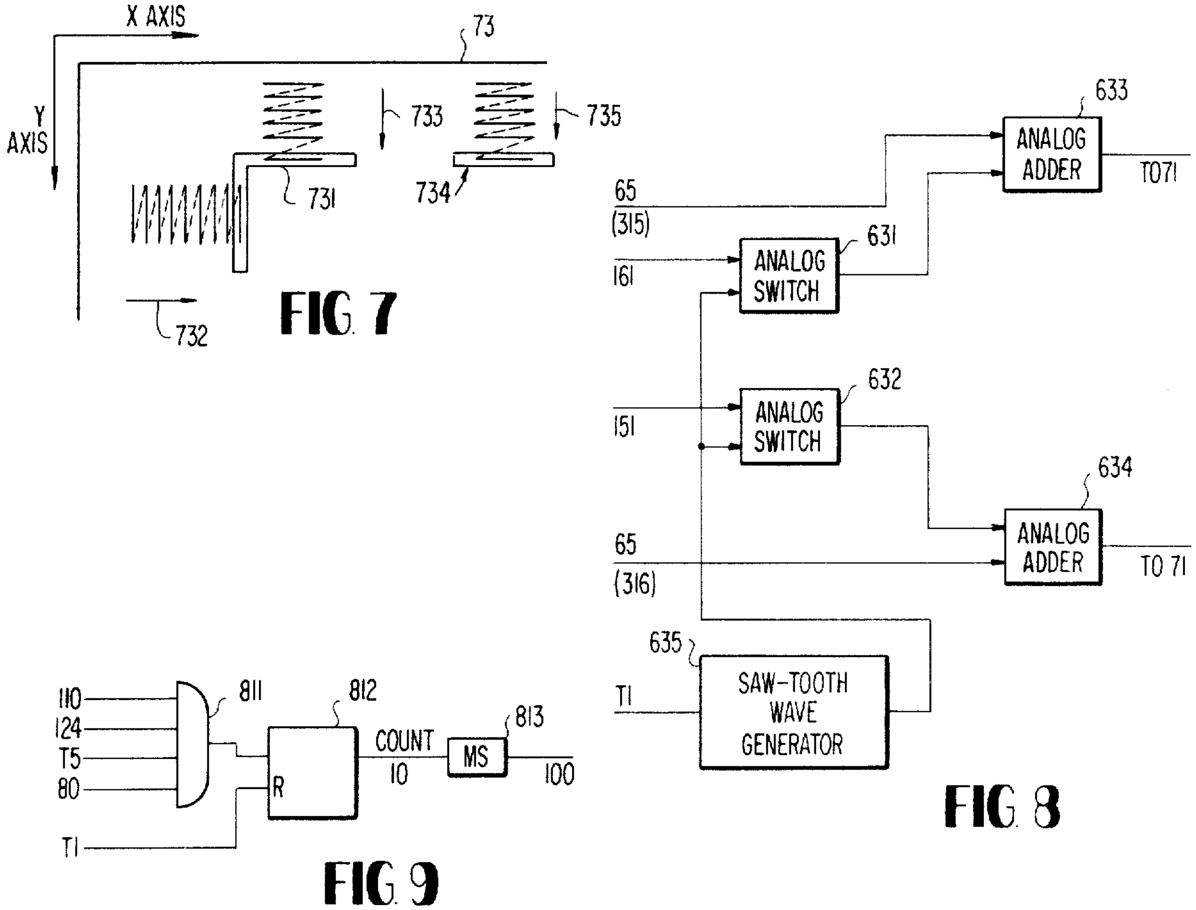
FIG. 7 shows a diagram illustrating a method of scanning the reference mark and tilt mark.
FIG. 8 shows a diagram of a CRT drive circuit used for the present invention.
FIG. 9 shows a diagram of a detection circuit used in the invention.

In FIG. 7 which illustrates a method of scanning the reference mark by the scanning beam of the CRT 71 of the scanning apparatus, a reference mark 731 and a tilt mark 734 are printed on the document 73 at given positions. These marks are scanned by the scanning beam of the CRT 71. The scanning beam in an X-direction scanning is shifted in an X-direction as indicated by an arrow 732 as it is swept in a Y-direction while the scanning beam in a Y-direction scanning is shifted in a Y-direction as indicated by an arrow 733 or 735 as it is swept in an X-direction.

Referring to FIG. 1, again, the scanning in this scanning apparatus is performed depending on positional data stored in an X-address register 41 with respect to X-coordinate and on positional data stored in a Y-address register 42 with respect to Y-coordinate.

The positional data stored in the X-address register 41 is converted into an analog signal by a digital-analog converter 61, and the positional data stored in the Y-address register 42 is converted into an analog signal by a digital-analog converter 62. These positional data converted in the form of analog signals energize the deflecting coil of the CRT 71 through the CRT drive circuit 63. Thus, the spot of the CRT 71 is positioned on an area designated by the X- and Y-addresses.

This scanning apparatus does not make tilt correction when the reference mark and tilt mark are scanned on the document. More specifically, a tilt register 53 is reset by a start pulse, and the scanning is performed on the assumption that there is no tilt of the document. Also, in the scanning on the character field on the document, the value corresponding to the tilt of the document is set into the tilt register 53 when the tilt mark is detected. Thus, the present scanning apparatus performs a tilt correction.

The scanning in the X-direction on the document is performed in the following manner. In FIG. 1, the CRT drive circuit 63 is controlled by the addition and subtraction control circuit 100, and a signal of sawtooth waveform is added to an analog signal from a tilt correction circuit 65 corresponding to the data stored in the Y-address register 42. Thus, the Y-direction deflecting coil of the CRT 71 is excited by the resultant signal. The circuit 100 operates to open the gate of an AND gate 11 and supply the address data in the X-address register 41 to an adder-subtractor 30 via the AND gate 11 and an OR gate 14. Under the control of the circuit 100, the adder-subtractor 30 receives through an OR circuit 25 a constant for increasing or decreasing the contents of the X-address register 41. The circuit 30 also receives under the control of the circuit 100 a signal for selecting either addition or subtraction. As a result, the output of the adder-subtractor 30 serves to renew the contents of the X-address register 41. In other words, the scanning in the X-direction is performed in sequence by addition or subtraction of a given value to or from the contents of the register 41 at every cycle of the saw-tooth wave added to the Y-address signal.

The scanning in the Y-direction on the document is performed in the following manner. In FIG. 1, the CRT drive circuit 63 is controlled by the addition and subtraction control circuit 100, and a saw-tooth wave is added to the analog signal of the tilt correction circuit 65 corresponding to the contents of the X-address register 41 and as a result, the X-direction deflecting coil of the CRT 71 is actuated. The circuit 100 opens the gate of an AND gate 12 and supplies the address data in the register 42 to the circuit 30 through the AND gate 12 and the OR gate 14. Under the control of the circuit 100, the adder-subtractor 30 is given through the OR gate 25 a constant for increasing or decreasing the contents of the register 42. Also, under the control of the circuit 100, the circuit 30 is supplied with a signal for selecting either addition or subtraction. Thus, the output of the circuit 30 serves to renew the contents of the Y-address register 42. In other words, the scanning in the Y-direction is carried out in sequence by adding or subtracting a given value to or from the contents of the register 42 at every cycle of the saw-tooth wave superposed on the X-address signal.

In scanning the document 73, the light beam emitted from the CRT 71 is reflected from the document 73 and received by the photomultiplier tube 72. This light is shaped by the threshold circuit 80 and given as a video pulse. In scanning the reference mark and tilt mark, the video pulse shaped by the circuit 80 is discriminated as either black or white in a detection circuit 74 whereby the reference and tilt marks are detected. Before the scanning, the data of the coordinate of the maximum scanning allowable position is stored in an end register 43. During the scanning, the present positional data in the X-address register 41 (in the X-direction scanning) or that in the register 42 (in the Y-direction scanning), and the data in the end register 43 are subjected to subtraction operations to determine if the data values are equal to each other which indicates the end of scanning. Before scanning the document, a start pulse is generated at the instant the document stops at the read position, and an X-reference register 51, a Y-reference register 52, and the tilt register 53 are reset.

This scanning apparatus performs the scanning in the X-direction in order to detect the leg portion of the reference mark intersecting with the X-axis direction, and sets into the X-reference register 51 the contents of the X-address register 41 at the timing when the reference mark is detected. Then, the scanning apparatus performs the scanning in the Y-direction in order to detect the leg portion of the reference mark intersecting with the Y-axis direction, and sets into the Y-reference register 52 the contents of the Y-address register 42 at the timing when the reference mark is detected. Scanning is also performed in Y-direction in order to detect the tilt mark, and the data in the Y-reference register 52 are subtracted from the contents of the Y-address register 42 when the tilt mark is detected, and the subtracted result is set into the tilt register 53.

The positional coordinate in scanning the character field is corrected by the tilt correction circuit 65 depending on the data of reference mark coordinate stored in the X-reference register 51 and in the Y-reference register 52, and the data of tilt of the document stored in the register 53.

Figure 3:
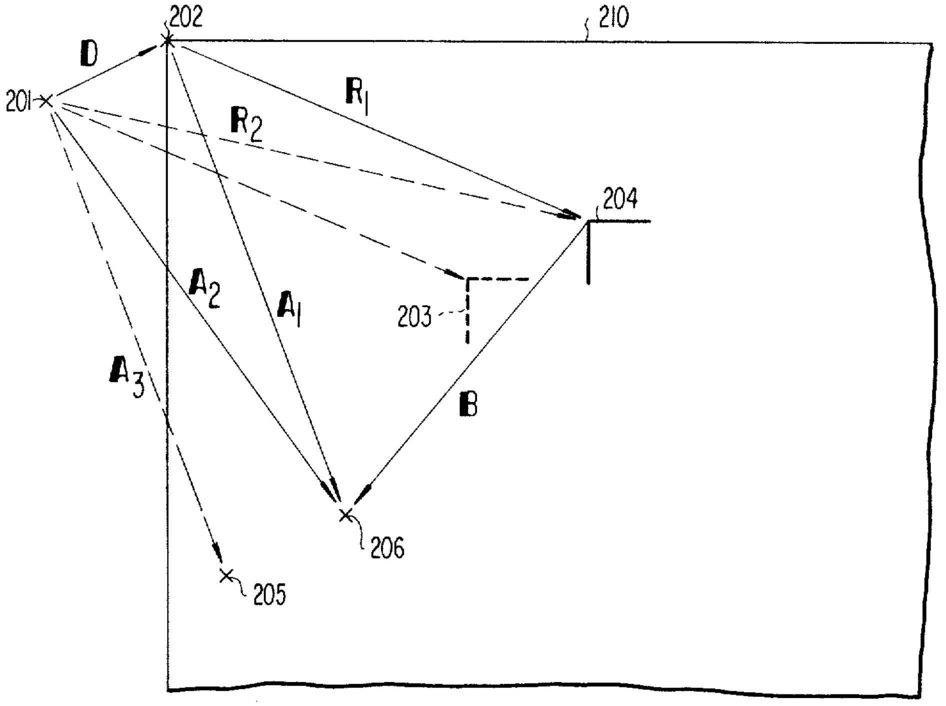
FIG. 3 shows a diagram indicating a positional deviation of a document.

In FIG. 3 which shows an example of deviation of the document stopping position, it is assumed that a document 210 stops at a position with an error of a vector D at its left upper end 202 relative to a normal stopping position 201. Under such state, the error of address is corrected by the vector D when an arbitrary position on the document is scanned. In the present scanning apparatus, a reference mark 204 disposed on the document is used for correcting the error of the vector D. A vector $\mathbf{R}_1$ from the left upper end 202 of the document to the reference mark 204 is supplied as a coordinate data of the reference mark 204, and a relative position vector B from the reference mark 204 is supplied as a coordinate data of a point 206 to be scanned on the document, i.e., vector $\mathbf{A}_1$ which is the sum of the vector $\mathbf{R}_1$ and the vector B is supplied as a coordinate data of the point 206 to be scanned, to the scanning apparatus from an external device such as a central processor. When the document is in the normal stopping position, i.e., when the reference mark 204 is in a position 203, the scanning apparatus does not correct the stopping position error and gives a coordinate on the basis of the normal stopping position 201. Accordingly, the coordinate data vectors $\mathbf{R}_1$ and B are used directly, and the scanning is started from a point 205 designated by a vector $\mathbf{A}_3$ based on the normal stopping position 201. In this operation, the vector $\mathbf{A}_3$ is equal to the vector $\mathbf{A}_1$.

In a case where that the document stopping position is deviated, the scanning apparatus performs scanning according to the coordinate vector $\mathbf{R}_1$ of the reference mark supplied from an external device such as a central processor and thereby finds the position of the reference mark 204. Then, the vector B is added to a coordinate vector $\mathbf{R}_2$ from the normal stopping position 201 to the reference mark 204 whereby a coordinate vector $\mathbf{A}_2$ of the point 206 to be scanned is obtained. In this manner, the deviation of the document stopping position can be electronically corrected.

In FIGS. 4*a* to 4*d* which show reference marks of various shapes and scanning start points on the document 73, the relationship between the angle of reference mark and the scanning start point and the scanning direction differ depending on the shape of the reference mark because the reference mark is scanned in the direction toward the reference mark from the outer side. For example, FIG. 4(*a*) shows a reference mark consisting of a lateral mark in the upper part and a longitudinal mark in the left part. This reference mark has an X-direction scanning start point 214 and a Y-direction scanning start point 216, which are found from the approximate coordinates of the vertex of angle 212.

Figure 4:
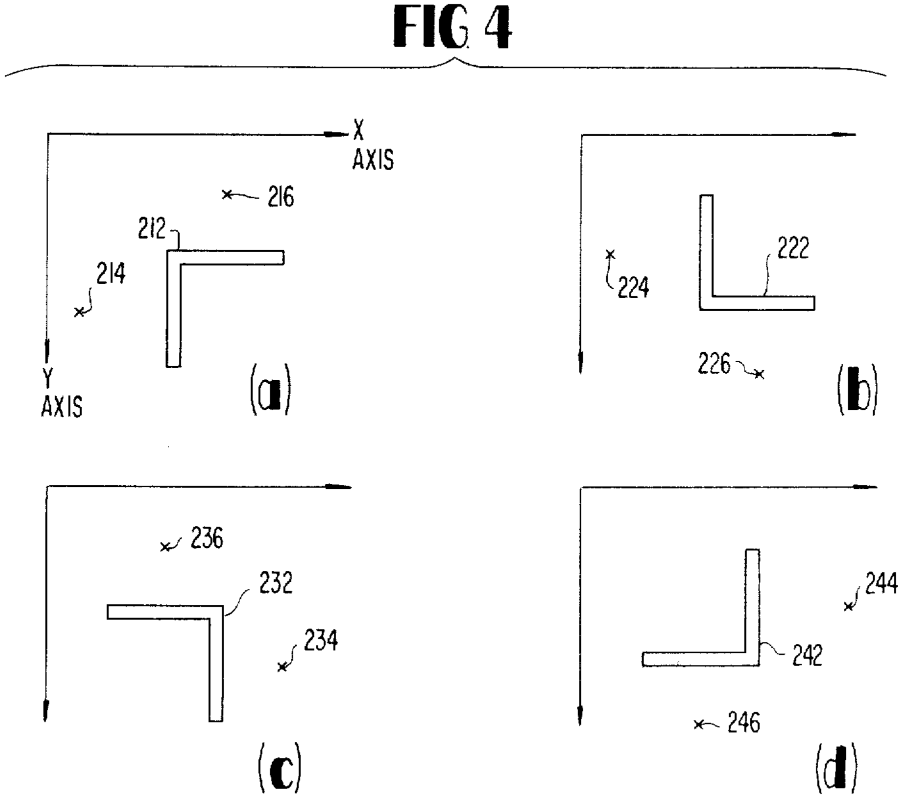
FIG. 4 shows a diagram of the reference marks and the scanning start points.

FIG. 4(b) shows a reference mark consisting of a lateral mark in the lower part, and a longitudinal mark in the left part, with an X-direction scanning start point 224 and a Y-direction scanning start point 226. While FIG. 4(*c*) shows another reference mark consisting of a lateral mark in the upper part, and a longitudinal mark in the right part, with an X-direction scanning start point 234 and a Y-direction scanning start point 236. FIG. 4(*d*) shows other reference marks consisting of a lateral mark in the lower part, and a longitudinal mark in the right part, with an X-direction scanning start point 244 and a Y-direction scanning start point 246.

The shape of the mark is assumed to be XO in the case of (a) and (b) where the X-coordinate at the X-direction scanning start point is smaller than the X-coordinate of the vertex of the angle of the reference mark, and to be X1 in the case of (*c*) and (*d*) where the X-coordinate at the X-direction scanning start point is larger than the X-coordinate of the vertex of the angle of the reference mark.

Similarly, the shape of the mark is assumed to be YO in the case of (*a*) and (*c*) where the Y-coordinate at the Y-direction scanning start point is smaller than the Y-coordinate of the vertex of the angle of the reference mark, and to be Y1 in the case of (b) and (d) where the former Y-coordinate is larger than the latter Y-coordinate. In other words, the shape of the reference mark (*a*) is expressed as X0Y0, (*b*) as X0Y1, (*c*) as X1Y0, and (d) as X1Y1.

A reference mark on the document is scanned in the following manner. In FIG. 4(*a*), the X-direction scanning start point 214 is found from the approximate coordinate of the vertex of angle 212 thereof, and the longitudinal mark of the reference mark is detected by the X-direction scanning. Then, the Y-direction scanning start point 216 is obtained from the coordinate of the longitudinal mark detection point, and the lateral mark of the reference is detected by the Y-direction scanning.

Figure 5:
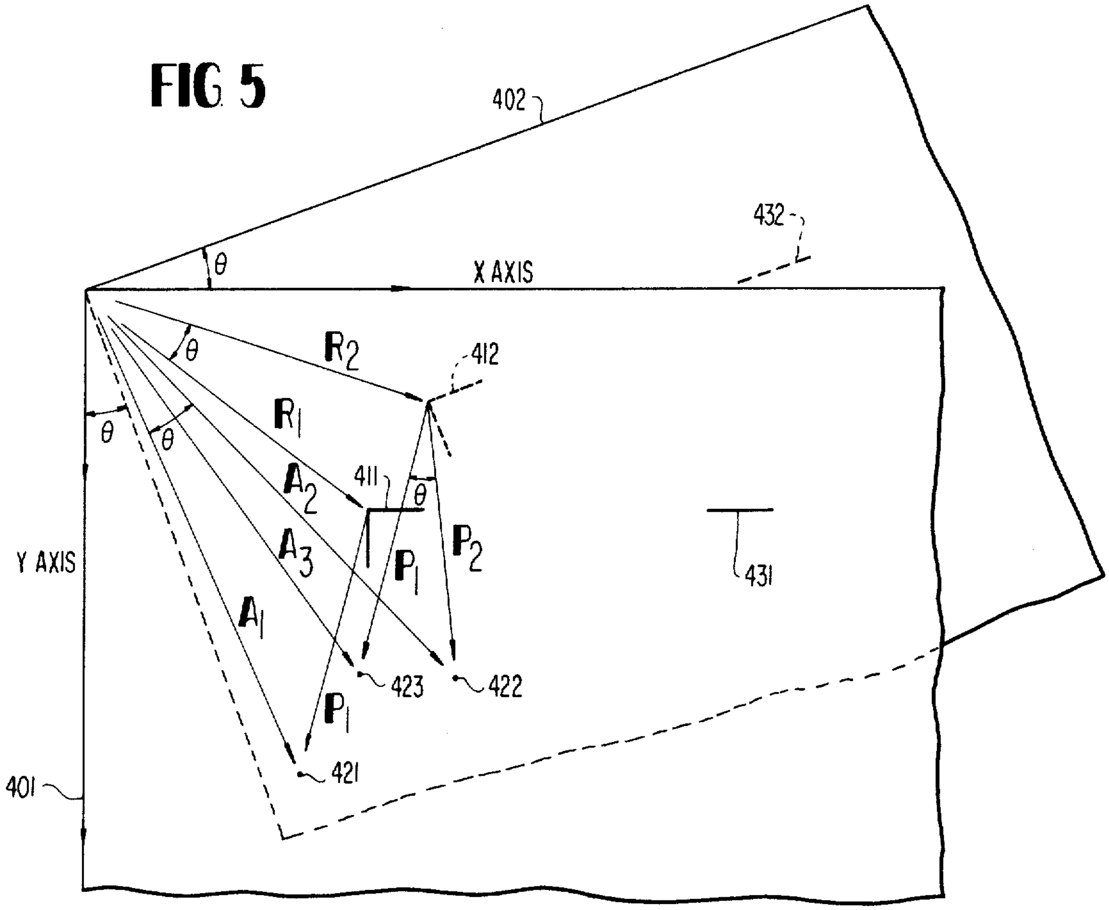
FIG. 5 shows a diagram of a positional deviation due to the tilt of the document.

In FIG. 5 which shows the tilt of a document, a reference mark and a tilt mark on the document, the tilt of a scanning point, and the error caused when a scanning point on the document is designated by coordinates having errors due to deviation of the document stopping position and the error due to tilt of the document.

The error due to deviation of the document stopping position may be corrected in such a manner that, on the assumption that there is no tilt of the document, the error of the coordinates of the reference mark provided on the document is detected and the coordinates of the scanning point are corrected according to the detected error. When the document tilts, the reference mark tilts, similarly, Hence, the error of the coordinates of the reference mark is the sum of the error due to deviation of the document stopping position and error due to tilt thereof.

In FIG. 5, assuming that a document 401 stops in position without positional deviation and tilt wherein a reference numeral 411 denotes a reference mark, 431, a tilt mark, and 421, a scanning point. For the sake of simplicity, the document 401 is compared with a document 402 which stops without positional deviation but with a tilt. In contrast to the document 401, the points on the document 402 are rotated by an angle $\theta$ on the left upper end of the document, and its reference mark 412, a tilt mark 432 and a scanning point 422 are located as shown therein. Then, the following relationships are obtained.

$$\mathbf{R}_2 = \mathbf{\Theta}\,\mathbf{R}_l$$

$$\mathbf{A}_2 = \mathbf{\Theta}\,\mathbf{A}_l$$

where $\mathbf{\Theta}$ the rotation matrix of the rotation angle $\theta$ $\mathbf{R}_1$ the coordinate vector of the reference mark 411

$\mathbf{R}_2$ the coordinate vector of the reference mark 412

$\mathbf{A}_1$ the coordinate vector of the scanning point 421

$\mathbf{A}_2$ the coordinate vector of the scanning point 422

Also, a scanning point 423 indicated by the vector $\mathbf{A}_3$ is obtained as a result of steps for correcting the stopping position deviation without taking the tilt into consideration. The vector $\mathbf{A}_3$ is expressed as $$\mathbf{A}_3 = \mathbf{R}_2 + \mathbf{P}_1$$

where $\mathbf{P}_1$ stands for the position vector of the scanning point 421 relative to the reference mark 411.

The three equations shown above may be rearranged as follows by the use of relationship, $\mathbf{A}_1 = \mathbf{R}_1 + \mathbf{P}_1$.

$$\mathbf{A}_2 = \mathbf{\Theta}\,\mathbf{A}_1 = \mathbf{\Theta}\,\mathbf{R}_1 + \mathbf{\Theta}\,\mathbf{P}_1 = \mathbf{R}_2 + \mathbf{P}_1 + (\mathbf{\Theta} - \mathbf{E})\,\mathbf{P}_1 = \mathbf{A}_3 + (\mathbf{\Theta} - \mathbf{E})\,(\mathbf{A}_3 - \mathbf{R}_2)$$

where E stands for the fundamental two *x* two matrix.

This equation may further be rearranged as follows.

$$\begin{pmatrix} A_2x \\ A_2y \end{pmatrix} = \begin{pmatrix} A_3x \\ A_3y \end{pmatrix}$$

$$+\left\{\begin{pmatrix} \cos\theta & \sin\theta \\ \sin\theta & \cos\theta \end{pmatrix} - \begin{pmatrix} 1 & \theta \\ \theta & 1 \end{pmatrix}\right\}\left\{\begin{pmatrix} A_3x \\ A_3y \end{pmatrix} - \begin{pmatrix} R_2x \\ R_2y \end{pmatrix}\right\} = \begin{pmatrix} A_3x \\ A_3y \end{pmatrix}$$

$$+\begin{pmatrix} \cos\theta - 1 & \sin\theta \\ \sin\theta & \cos\theta - 1 \end{pmatrix}\begin{pmatrix} A_3x - R_2x \\ A_3y - R_2y \end{pmatrix} = \begin{pmatrix} A_3x \\ A_3y \end{pmatrix}$$

$$+\begin{pmatrix} -(1-\cos\theta)(A_3y - R_2x) + \sin\theta\,(A_3x - R_2y) \\ \sin\theta\,(A_3x - R_2x) - (1-\cos\theta)(A_3y - R_2y) \end{pmatrix}$$

$$= \begin{pmatrix} A_3x + \sin\theta\,(A_3y - R_2y) - (1-\cos\theta)(A_3x - R_2x) \\ A_3y - \sin\theta\,(A_3x - R_2x) - (1-\cos\theta)(A_3y - R_2y) \end{pmatrix}$$

where $A_2x$, $A_2y$: the components of the vector $\mathbf{A}_2$.

$A_3x$, $A_3y$: the components of the vector $\mathbf{A}_3$.

$R_2x$, $R_2y$: the components of the vector $\mathbf{R}_2$.

If $\theta$ is small, then, $1 - \cos\theta = 0$ and $\sin\theta = \tan\theta$. Therefore, $$\begin{pmatrix} A_2x \\ A_2y \end{pmatrix} \doteq \begin{pmatrix} A_3x + \tan\theta\,(A_3y - R_2y) \\ A_3y - \tan\theta\,(A_3x - R_2x) \end{pmatrix}$$

The foregoing scanning operation is an example where no error is involved in the document stopping position. According to the invention, it is apparent that the same scanning operation as above can be realized even when the document stopping position is deviated. In such case, the relationship $\mathbf{R}_2 = \mathbf{\Theta}\ \mathbf{R}_1 + \mathbf{D}$, $\mathbf{A}_2 + \mathbf{\Theta}\ \mathbf{A}_1 + \mathbf{D}$ (where D stands for the vector of error due to stopping position deviation, is used).

Thus, the error due to the document tilt can be corrected in the following manner. The coordinates $R_2x$ and $R_2y$ of the reference mark 412 are obtained, and the document stopping position deviation is corrected by adding the coordinate of reference mark to the relative coordinate of reference mark 411 and scanning point 421. The resultant values are $A_3x$ and $A_3y$. Then, the error due to document tilt is corrected according to the coordinate values $R_2x$, $R_2y$, $A_3x$ and $A_3y$ and $\tan\theta$. The coordinates $A_2x$ and $A_2y$ are given as follows.

$$A_2x = A_3x + (A_3y - R_2y)\tan\theta$$

$$A_2y = A_3y - (A_3x - R_2y)\tan\theta$$

where $\tan\theta$ is $Sy/Sx$ ($Sx$, $Sy$: the relative coordinates of a reference mark and a tilt mark).

When the value of $Sx$ is predetermined, the value of tan 0 may be expressed only by the relative Y-coordinate of a reference mark and a tilt mark. In some cases it is considered that the distance between the reference mark and the tilt mark is determined in two values; the ordinary distance, and half the ordinary distance. In the latter instance, the relative Y-coordinate of the reference mark and the tilt mark is doubled whereby its $\tan\theta$ can be made equal to that in the case of ordinary distance.

The present scanning apparatus will be described in more detail by referring to FIGS. 1 and 2(*a*), (*b*).

A start pulse is generated when a document stops at the read position and is in the readable state. This start pulse resets a shape register 91, the X-reference register 51, the Y-reference register 52, and the tilt register

53. Also, the start pulse resets a format counter 112 and a detection counter 113, and sets a flip-flop 110 in FIG. 2(*a*). Moreover, the start pulse sets a flip-flop 111 through an OR circuit 108. Still further, the start pulse resets a stage counter 120 through an OR circuit 115. When the flip-flop 110 is set, the scanning apparatus sends a request to the central processor or other external device for format data. The gate of an AND circuit 13 (FIG. 1) is opened to allow the format data to pass therethrough.

The first format data including the information on the shape of reference mark is supplied from the central processor. When the format counter 112 is reset to 0, an AND circuit 131 provides an output to cause an AND circuit 90 to open its gate, through which the format data is supplied to a shape register 91 and set therein as a shape of reference mark. The central processor or other external device generates an advance pulse to set the counter 112 to 1 and enables an AND circuit 133. The output of this AND circuit 133 is supplied to an OR circuit 152 and AND circuits 174 and 185 shown in FIG. 2(*b*).

The second format data designates the approximate value of the X-coordinate of the vertex of the angle of a reference mark, and is supplied to the adder-subtractor 30 via the AND circuit 13 and the OR circuit 14 as shown in FIG. 1. Also, the circuit 30 receives a constant $a_1$ corresponding to the difference between the reference mark and the X-coordinate of the X-direction scanning start point through an AND circuit 185, an OR circuit 180 (FIG. 2(*b*)) and an OR circuit 25 (FIG. 1). When the shape of the reference mark is XO, the AND circuit 174 is enabled and a subtraction signal is supplied to the circuit 30 through an OR circuit 170 whereby the circuit 30 performs subtraction. Also, when the shape of the reference mark is X1, the AND circuit 174 is not enabled and no subtraction signal is applied, thereby causing the adder-subtractor 30 to perform an adding operation. Thus, the output data of the circuit 30 indicates the X-coordinate of the X-direction scanning start point.

Figure 6:
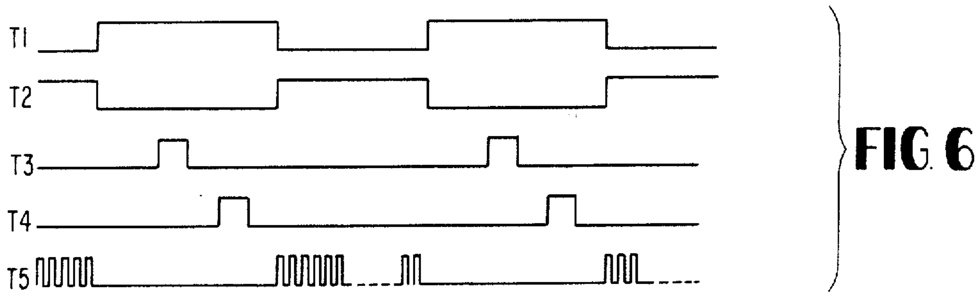
FIG. 6 shows a time chart of the timing circuit shown in FIG. 2.

A timing circuit 150 shown in FIG. 2(*a*) generates various timing pulses for controlling the operation of the scanning apparatus. In FIG. 6 which shows 5 different timing pulses generated by the circuit 150, T1 is timing pulse controlling the computation of coordinate positions. During the interval of this pulse, the X-address register or the Y-address register is modified. Timing pulse T2 is the inversion of timing pulse T1. Timing pulse T3 serves as a sampling pulse for setting into a register the adding output computed in the interval of timing pulse T1. Timing pulse T4 is a delayed pulse by a given time behind timing pulse T3 and signifies that one addition-subtraction operation is completed. Timing pulse T1 serves as the fly-back time when the CRT 71 is driven and scanned. Timing pulse T1 causes the CRT drive circuit 63 to generate a sawtooth wave signal. Timing pulse T5 is generated in the interval of timing pulse T2 and serves as a sampling pulse for the video signal provided in the photomultiplier tube 7 and shaped in the threshold circuit 80.

In FIGS. 1 and 2(*a*) and 2(*b*), the signal representing the X-coordinate of the X-direction scanning start point is fed to the adder-subtractor 30, and the output signal of the AND circuit 133 is given to an AND circuit 153 through the OR circuit 152. Thus, when timing pulse T3 is supplied to the AND circuit 153, the output of the AND circuit 153 opens the gate of the X-address register 41 and sets the output data of the adder-subtractor 30 in the X-address register 41.

When the transfer of the second format data is completed, another advance pulse is generated from the central processor, and the format counter 112 is advanced to 2. This causes AND circuit 135 to be enabled and the resultant signal is sent to an OR circuit 162 and AND circuits 177 and 179. The third format data designates the approximate value of the Y-coordinate of the vertex of the angle of the reference mark. This data is supplied to the circuit 30 through the AND circuit 13 and the OR circuit 14. Simultaneously, the signal of a constant $a_2$ corresponding to the difference between the reference mark and the Y-coordinate of the X-direction scanning start point passes through the AND circuit 179, and goes to the circuit 30 through the OR circuit 180 and the OR circuit 25. When the shape of the reference mark is Y1, an inverter circuit 166 operates to generate a subtraction signal supplied to the adder-subtractor 30 via the AND circuit 177 and the OR circuit 170 whereby the circuit performs the subtracting operation. In addition, when the shape of reference mark is YO, the inverter circuit 166 is not excited. As a result, no subtraction signal is applied to the adder-subtractor 30, and an adding operation is performed. Then, the output data of the circuit 30 indicates the Y-coordinate of the X-direction scanning start point. When timing pulse T3 is generated, the output signal of an AND circuit 163 which is supplied with the output signal of the AND circuit 135 through the OR circuit 162, is given to the Y-address register 42, and the output data of the circuit 30 is set in the register 42.

Upon completion of the transfer of the third format data, another advance pulse is generated to cause the format counter 112 to advance to 3. At the same time, the advance pulse triggers a monostable circuit 103. At this moment, because the flip-flop 110 is set and the format counter 112 is 3, an AND circuit 107 is enabled with this AND circuit 107 enabled, the flip-flop 111 is reset by the monostable circuit 103 through an OR circuit 109, and a third stage 123 of the stage counter 120 is set through an OR circuit 119. Since the flip-flop 110 is set and a detection counter 113 is in the 0 state, the output of the third stage 123 actuates an AND circuit 143. The output of the AND circuit 143 is fed to an OR circuit 151 and AND circuits 171 and 181. The data stored in the X-address register 41 is given again to the adder-subtractor 30 through the AND circuit 11 and the OR circuit 14 because the output signal of the OR circuit 151 is sent to the AND circuit 11. At this time point, a constant e corresponding to the maximum scanning distance is given to the adder-subtractor 30 via and AND circuit 181 and the OR circuits 180 and 25. When the shape of reference mark is X1, the inverter circuit 165 generates an output signal supplied to the circuit 30 through the AND circuit 171 and the OR circuit 170 whereby the circuit 30 performs a subtraction operation on the X-coordinate of the X-direction scanning start point with the constant *e*. Also, when the shape of reference mark is XO, the AND circuit 171 generates no output signal, i.e., a subtraction signal, to be supplied to the adder-subtractor 30. Therefore, the circuit 30 performs an addition operation on the X-coordinate of the X-direction scanning start point and the constant *e*. As a result, an output of X-coordinate at the maximum or minimum position in the scanning in the X-direction is generated. The output of an AND circuit 157 excited by the output of the flip-flop 110 and the output of the third stage 123 is applied to an AND circuit 156 through an OR circuit 155. At the same time, timing pulse T3 is supplied to the AND circuit 156. Consequently, the output signal of the circuit 156 is sent to the end register 43, and the X-coordinate of the maximum or minimum position in the X-direction scanning in the circuit 30 is set in the end register. As soon as this adding operation is completed, the stage counter 120 is advanced by timing pulse T4 through an AND circuit 116, and thus, the fourth stage of the stage counter 120 is set. After this operation, the output of the fourth stage inhibits further timing pulses T4 to the counter 120. When the fourth stage of the stage counter 120 is set, the scanning apparatus starts the X-direction scanning to detect the reference mark. An AND circuit 146 receives the output signal from the fourth stage 124, the set output signal of the flip-flop 110, and the 0 output signal from the detection counter 113, and thereby generates an output signal. This signal is supplied to the OR circuit 151, the OR circuit 152, an AND circuit 172, and an AND circuit 182. The output signal through the OR circuit 151 is fed to the AND circuit 11 and causes the contents of the X-address register 41 to be supplied to the adder-subtractor 30 through the OR circuit 14. The AND circuit 182 is given a constant corresponding to the X-direction scanning pitch. This circuit 182 generates an output signal in response to timing pulse T1. The constant of the output signal of the AND circuit 182 is $S_1$, which is supplied to the adder-subtractor 30 through the OR circuit 180 and the OR circuit 25.

If the shape of reference mark is X1, the adder-subtractor 30 performs a subtraction, and if it is X0, the circuit 30 performs an addition, as in the foregoing manner. In addition, when the AND circuit 146 is actuated, it generates a signal supplied to the AND circuit 153 through the OR circuit 152. The AND circuit 153 operates upon receipt of timing pulse T3 to cause the X-address register 41 to open its gate into which the contents of the adder-subtractor are set. The adder-subtractor 30 carries out addition or subtraction once for each timing pulse T3, i.e., each cycle of the saw-tooth wave applied to the Y-address in the CRT drive circuit 63. Thus, the X-direction scanning is performed.

The X-direction scanning operation will be described in connection with the CRT drive circuit 63 in FIG. 8. A saw-tooth wave generator 635 receives timing pulse T1 from the timing circuit 150 (FIG. 2(*a*)) of the addition and subtraction control circuit 100 (FIG. 1), and generates a saw-tooth wave signal in synchronism with pulse T1. The saw-tooth wave from the generator 635 is given to analog switches 631 and 632.

In the scanning in the X-direction, the OR circuit 151 in FIG. 2(*b*) generates an output but the OR circuit 161 generates no output. As a result, the saw-tooth wave signal passes through the analog switch 632 but is blocked at the analog switch 631. In an analog adder 634, the saw-tooth wave signal is added to the analog signal indicating the Y-address supplied from the tilt correction circuit 65. While the analog signal which indicates the X-address supplied from the circuit 65 passes directly through an analog adder 633 since no output is produced from the analog switch 631. These analog signals are supplied to the X and Y deflecting coils to cause the scanning beam to be deflected in the foregoing manner.

Referring to FIG. 1, the scanning beam from the CRT 71 is reflected from the document 73 and then received by the photomultiplier tube 72. The video signal from the tube 72 is shaped by the threshold circuit 80 and supplied to the detection circuit 81. The circuit 81 discriminates the video signal with respect to signal level (black or white) thereby detecting the reference mark. This circuit 81 comprises an AND circuit 811, a counter 812, and a monostable circuit 813 as shown in FIG. 9. The AND circuit 811 receives the output of the flip-flop 110, the output of the fourth stage 124 of the stage counter 120, and the output signal from the tube 72 through the threshold circuit 80. The counter 812 generates an output signal when its count reaches 10, and is reset by timing pulse T1.

Referring to FIG. 2(*a*), the reference mark is detected in the following manner. The AND circuit 811 opens its gate under the condition that the flip-flop 110 is set, the fourth stage 124 of the counter 120 is set, and timing pulse T5 is supplied. As soon as the scanning spot reaches the reference mark, a black signal from the photomultiplier tube 72 is fed to the AND circuit 811 through the threshold circuit 80 and then, is supplied to the counter 812. When the counter 812 counts a value larger than a predetermined value (such as 10), the counter 812 generates an output, which triggers the monostable circuit 813. This indicates that the reference mark is detected. The detection circuit 81 is capable of counting the video signal value and detects the point where the video signal value is larger than a given value. Then, the circuit 81 prevents the reference mark from being detected at a wrong position due to a stain on the document, noise or other reasons.

Figure 2A:
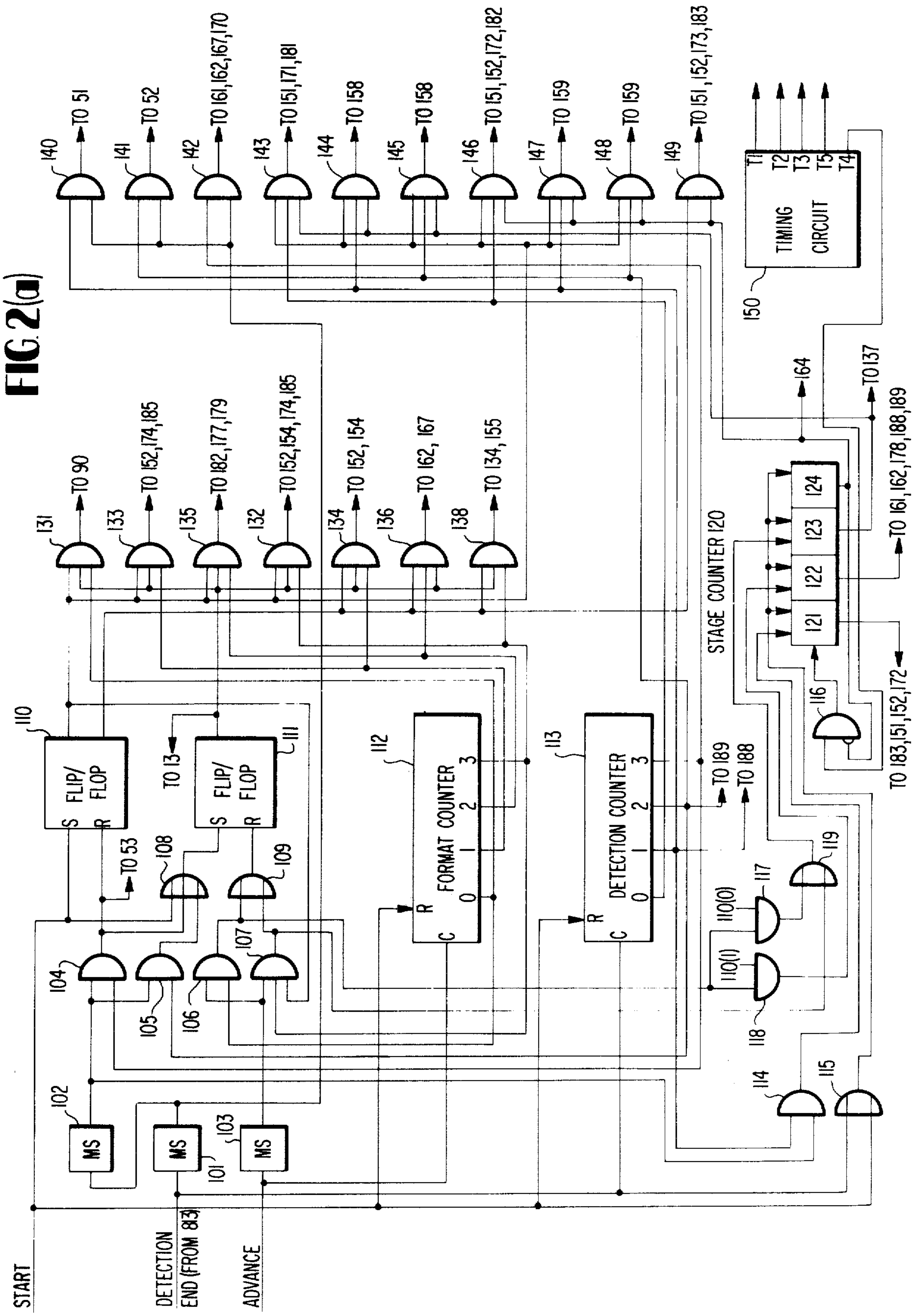
FIGS. 2(*a*) and 2(*b*) show diagrams of the addition and subtraction control circuit shown in FIG. 1.
Figure 2B:
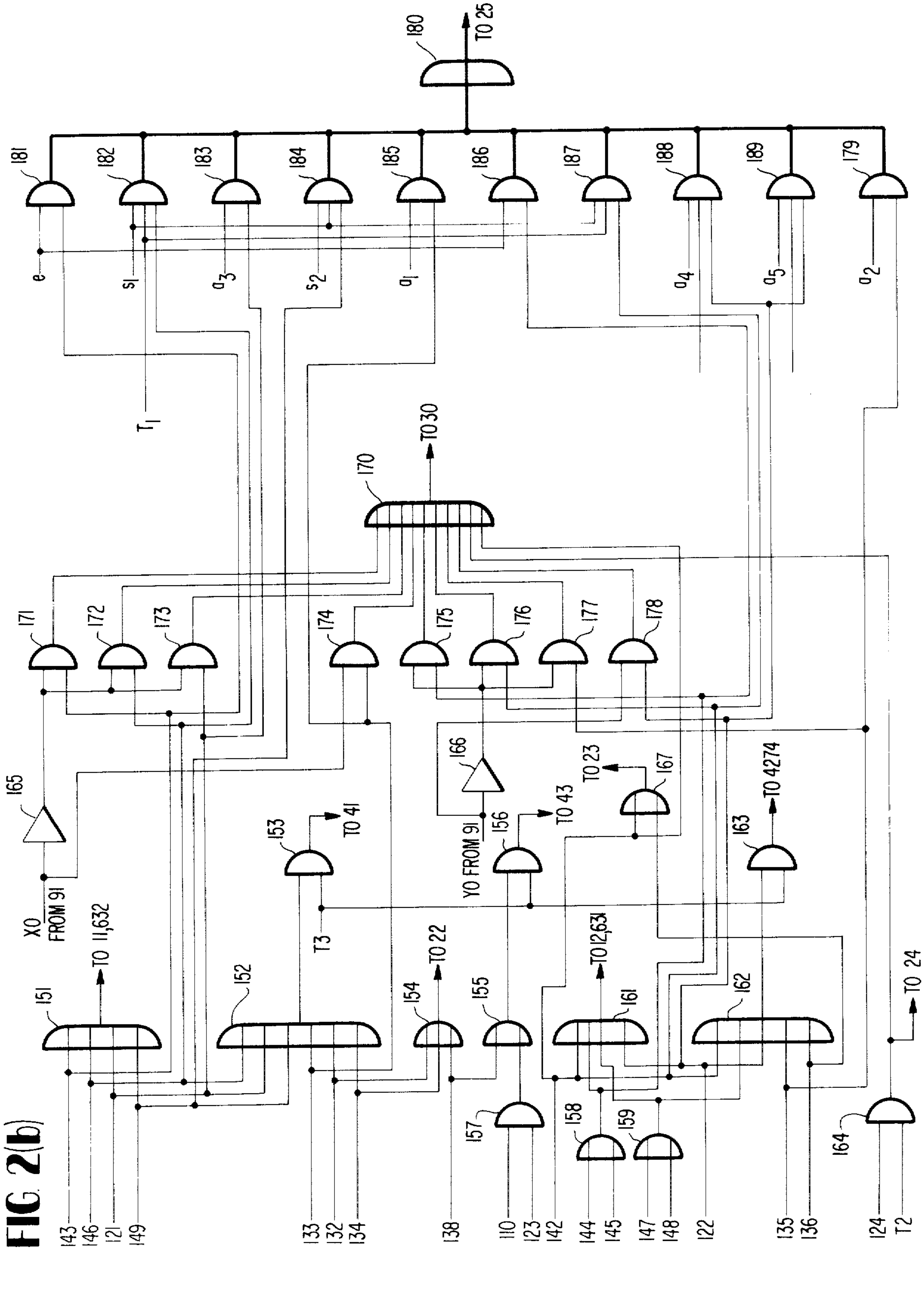

Referring to FIGS. 1, 2*a* and 2*b*, the circuit 81, when the reference mark is detected, generates a detection end signal supplied to the addition and subtraction control circuit 100, thereby causing the detection counter 113 to advance to 1 and the stage counter 120 to be reset through the OR circuit 115. Thus, the scanning in the X-direction is completed. The detection end signal triggers the monostable circuit 101, to cause the AND circuit 140 to be enabled because the contents of the detection counter 113 are 1 whereby the contents of the X-address register 41 at the timing when the reference mark is detected are set into the X-reference register 51. Thus, the detection of the X-coordinate of the reference mark is completed.

If no reference mark is detected after scanning beyond a given distance in the X-direction, the scanning apparatus operates in such manner that the contents of the end register 43 is subtracted from the contents of the X-address register 41 and the resultant sign is checked during the X-direction scanning every time timing pulse T2 is generated. If this sign is inverted, this indicates that no reference mark is detected. More specifically, when the fourth stage 124 of the stage counter 120 is set during the X-direction scanning, an AND circuit 164 is actuated by timing pulse T2, and the contents of the end register 43 are supplied to the adder-subtractor 30 through the AND circuit 24 and the OR circuit 25. Also, a subtraction signal is sent to the circuit 30 via an AND circuit 164 and the OR circuit 170, and thus, the contents of the end register 43 are subtracted from the previously given contents of the X-address register 41. The resultant sign of this subtraction is treated by the circuit 100 whereby the absence of a reference mark is detected.

The Y-direction scanning of a reference mark will be described below. A monostable circuit 101 triggered by the detection end signal triggers at its trailing edge a monostable circuit 102. On the assumption that the detection counter 113 is in the 1 state, the circuit 102 excites an AND circuit 114 to cause a first stage 121 of the stage counter 120 to be set. When the first stage 121 is set, the contents of the X-address register 41 are supplied to the adder-subtractor 30 through the AND circuit 11 and the OR circuit 14. At this moment, because the first stage 121 is set, the constant $a_3$ corresponding to the difference between the X-coordinate of the reference mark and that of the Y-direction scanning start point passes through an AND circuit 183 and is supplied to the adder-subtractor 30 by way of the OR circuit 25. When the shape of the reference mark is X1, a subtraction signal is supplied to the circuit 30. Also, when the shape of the reference mark is X0, no subtraction signal is supplied thereto. Hence, an addition-subtraction signal is supplied to the adder-subtractor 30 whereby addional or subtraction is carried out. Thus, the circuit 30 indicates the X-coordinate of Y-direction scanning start point. When the first stage 121 is set, the AND circuit 153 operates, upon receipt of the output signal from the OR circuit 152 and timing pulse T3, to cause the output of the adder-subtractor 30 to be set into the X-address register 41. After these operations, the stage counter 120 is shifted by timing pulse T4 via the AND circuit 116. Then, the second stage 122 of the counter 120 is set and the resultant signal is given to an OR circuit 161. Consequently, the contents of the Y-address register 42 is sent to the adder-subtractor 30 through the AND circuit 12 and through the OR circuit 14. At this stage of operation, a constant $a_4$ corresponding to the difference between the Y-coordinate of the X-direction scanning start point and that of the Y-direction scanning start point passes through an AND circuit 188 because the detection counter 113 is in the 1 state. This signal $a_4$ is then supplied to the circuit 30 via the OR circuit 180 and the OR circuit 25. If the shape of reference mark is YO, an AND circuit 178 is enabled, and a subtraction signal is fed to the circuit 30 through the OR circuit 170 whereby subtraction is performed. Moreover, when the shape of the reference mark is Y1, the AND circuit 178 is not actuated and the adder-subtractor 30 performs addition whereby the Y-coordinate of the Y-direction scanning start point is obtained. The contents of the circuit 30 are set into the Y-address register 42 upon the operation of the AND circuit 163 by timing pulse T3. The third stage 123 of the counter 120 is set by timing pulse T4, and the output of the third stage 123 enables an AND circuit 144 which also receives the output of flip-flop 110 and the 1 output of the detection counter 113. The output of the AND circuit 144 is supplied to the AND circuit 12 via an OR circuit 158 and the OR circuit 161 to cause the contents of the Y-address register 42 to be sent to the adder-subtractor 30. At the same time, a constant $e$ corresponding to the maximum distance of the Y-direction scanning is applied to the circuit 30 through an AND circuit 186, the OR circuits 180 and 25. These signals are computed together according to the shape of the reference mark whereby the Y-coordinate of the Y-direction scanning start point is obtained. The Y-coordinate signal is set into the Y-address register 42 in response to the operation of the AND circuit 163 enabled by timing pulse T3. Then, the fourth stage 124 of the stage counter 120 is set by timing pulse T4 whereby the scanning apparatus starts the Y-direction scanning and the detection of the reference mark. When the AND circuit 147 is actuated, the adder-subtractor 30 receives through an OR circuit 159 and the OR circuits 180 and 25 a constant $S_1$ corresponding to the Y-direction scanning pitch in a similar manner to the operation of the X-direction scanning. The circuit 30 computes the contents of the Y-address register 42 according to the shape of the reference mark, and sets the computed result into the register 42 again at timing pulse T3 through an AND circuit 163. This computation is performed once for each timing pulse T3 generated at each cycle of the sawtooth wave applied to the X-address in the CRT drive circuit 63 in order to carry out the Y-direction scanning. The reference mark is detected in the same manner as in the X-direction scanning. When the reference mark is detected, the detection circuit 81 generates a detection end signal supplied to the addition and subtraction control circuit 100 to cause the counter 113 to advance to 2 and the stage counter 120 to be reset through an OR circuit 115 to complete the scanning. The detection end signal triggers the monostable circuit 101 and enables an AND circuit 141 and, because the counter 113 is in the 2 state, the contents of the register 42 (at the time the reference mark is detected) is set into the Y-reference register 52. Thus, the detection of the reference mark on the Y-coordinate is completed.

If no reference mark is detectable, the contents of the end register 43 are subtracted from that of the Y-address register 42 whereby the absence of the reference mark can be judged by the reference sign.

The circuit 101 triggers the monostable circuit 102 and enables an AND circuit 105 and, since the counter 113 is in the 2 state, sets the flip-flop 111 through the OR circuit 108. When the flip-flop 111 is set, the scanning apparatus produces a request for another format data, i.e., the fourth format data. This format data designates the relative X-coordinate of the reference mark and the tilt mark. In this state, the format counter 112 is in the value of 3. Therefore, an AND circuit 132 operates and the resultant signal is fed to OR circuits 152 and 154. The OR circuit 154 serves to allow the contents of the X-reference register 51 to pass through an AND circuit 22 and to go to the adder-subtractor 30 through the OR circuit 25. The output of the circuit 30 represents the coordinate of the tilt mark. The OR circcuit 152 excites the AND circuit 41 at timing pulse T3 to cause the X-coordinate of the tilt mark to be set into the register 41. When the transfer of the fourth format data is completed, the advance pulse generated by the central processor or other external device sets the format counter 112 to 0. The advance pulse triggers the monostable circuit 103 at its trailing edge, thereby enabling an AND circuit 106 because the format counter 112 is in the 0 state. The AND circuit 106 resets the flip-flop 111 through the OR circuit 109. Also, the AND circuit 106 sets the second stage of the counter 120 via an AND circuit 118. The operation after the second stage of the counter 120 is set is the same as that performed for the detection of the Y-coordinate of the reference mark, except that the AND circuit 189 is enabled instead of the AND circuit 188. When a tilt mark is detected, the detection circuit 81 generates a detection pulse, and the contents of the detection counter 113 advances to 3. This detection pulse triggers the circuit 101, which enables an AND circuit 142 since the detection counter is in the 3 state. The and circuit 142 causes the contents of the Y-address register 42 to pass through the AND circuit 12, through the OR circuit 161, and to be fed to the circuit 30 through the OR circuit 14. Also, the AND circuit 142 causes the contents of the Y-reference register 52 to pass through an AND circuit 23 via the OR circuit 167 and to be supplied to the circuit 30 through the OR circuit 25. The AND circuit 142 sends a subtraction signal through the OR circuit 170 to the circuit 30 whereby the output of the adder-subtractor 30 indicates the difference between the Y-coordinate of the reference mark and the Y-coordinate at the time when a tilt mark is detected. The AND circuit 142 sends a set pulse to the register 42 via the OR circuit 162 and the AND circuit 163. Thus, the output of the adder-subtractor 30 is set into the Y-address register 41. The monostable circuit 101 triggers the monostable circuit 102 and thereby enabling an AND circuit 104 because the detection counter 101 is in the 3 state. In this way, the contents of the Y-address register 41 is set into the tilt register 53. The AND circuit 104 resets the flip-flop 11o, and the detection of the coordinate of the reference mark, and the detection of the coordinate difference between the reference mark and the tilt mark are all completed.

Whether the document tilt is in the negative or positive direction can be judged by determining which Y-coordinate is larger, the reference mark or the tilt mark, by the sign resulting from the Y-coordinate subtraction on the reference mark and tilt mark. Generally, the tilt register 53 stores the Y-coordinate difference between the reference mark and the tilt mark, expressed in terms of absolute value, and the direction of the tilt to simplify the analog circuit described in detail hereafter. Since the fourth format data is the distance between the reference mark and the tilt, whether the distance between the tilt mark and the reference mark is ordinary or half can be judged by storing into a register the data whether the highest bit of the fourth format data is 1 or 0.

In the next step, the scanning apparatus operates in such manner that the flip-flop 111 is set by the output of the AND circuit 104 through the OR circuit 108 to allow the character scanning to start depending on the contents of the reference register 51 and the Y-reference register 52. For this scanning, the scanning apparatus makes a request to the central processor or other external device for format data. The purpose of the first format data is to designate the kind and direction of the character to be scanned. For explanatory simplicity, it is assumed that a character parallel with the X-axis is scanned in the X-direction. When the first format data is supplied, the kind and direction of the character to be scanned are designated, and an advance pulse is generated causing the format counter 112 to be set to 1. At the same time, the AND circuit 134 is enabled because the flip-flop 111 is set and the flip-flop 110 is reset. The output signal of the AND circuit 134 is fed to the OR circuits 152 and 154. The second format data is a value corresponding to the X-coordinate of character scanning start point, with a reference mark taken as the origin. This format data is supplied to the circuit 30 via the AND circuit 13 and the OR circuit 14 as the result of the flip-flop 111 being set. If the gate of the AND circuit 22 is opened by the output signal from the OR circuit 154, the contents of the register 51 are transferred to the circuit 30 through the AND circuit 22 and the OR circuit 25. In the adder-subtractor 30, the contents of the X-reference register 51 and the second format data are added together whereby an output signal indicating the X-coordinate of the character scanning start point is generated. This output signal enables the AND circuit 153 at the timing pulse T3 and is set into the X-address register 41. When another advance pulse is generated, the format counter 111 advances to 2 and thus actuates an AND circuit 136. While the third format data is a value corresponding to the Y-coordinate of character scanning start point, with the vertex of the angle of the reference mark taken as the origin, and is given to the adder-subtractor 30 via an AND circuit 13 and the OR circuit 14. When the gate of the AND circuit 23 is opened by the output of the AND circuit 136 through the OR circuit 167, the contents of the register 52 are supplied to the circuit 30 through the OR circuit 25. As a result, the adder-subtractor 30 generates an output signal indicating the Y-coordinate of character scanning start point. This output signal is set into the Y-address register 42 by way of the AND circuit 163 at the timing pulse T3. Also, when another advance pulse is supplied, the the contents of the counter 112 becomes a 3 to enable the AND circuit 138, and the signal supplied from the AND circuit 138 goes to the OR circuits 154 and 155. The fourth format data is a value corresponding to the X-coordinate of the character scanning end point, with the vertex of the angle of the reference mark taken as the origin. This format data is sent to the circuit 30 via the AND circuit 13 and the OR circuit 14. While the gate of the AND circuit 22 is opened through the OR circuit 154 by the output of the AND circuit 138 whereby the contents of the register 51 are supplied to the circuit 30 by way of the OR circuit 25. As a result, the adder-subtractor 30 generates an output signal indicating the X-coordinate of the character scanning end point. This output signal is set into the end register 43 by the timing pulse T3 through the AND circuit 156. Through these control operations, values corresponding to the coordinates of scanning start and end points after the correction of the error due to the deviation of the document stopping position, are stored in the X-address register 41, the Y-address register 42, and the end register 43. When another advance pulse is supplied, the contents of the format counter 112 becomes "0" and the monostable circuit 103 is triggered by the trailing edge of the advance pulse, the AND circuit 106 is enabled to cause the flip-flop 111 to be reset. Consequently, the second stage 122 of the counter 120 is set via an AND circuit 117 and the OR circuit 119. Then, an AND circuit 116 is actuated by timing pulse T4, the stage counter 120 is shifted, the third stage 123 thereof is reset, and the fourth stage thereof is set. When the flip-flop 110 is in the reset state, the AND circuit 149 is enabled, and the resultant output signal is supplied to the OR circuits 151 and 152, and AND circuits 173 and 184. The contents of the X-address register 41 passes through the AND circuit 11 through the OR circuit 151 and then is applied to the adder-subtractor 30 through the OR circuit 14. At the same time, a constant $S_2$ corresponding to the character scanning pitch is passed through the AND circuit 184 by the timing pulse T1 and supplied to the circuit 30 by way of the OR circuits 180 and 25. The circuit 30 performs the computation on the signals supplied thereto and generates an output signal given to the X-address register through the AND circuit 153 excited by the timing pulse T3. This adding operation is performed once for each cycle of the timing pulses T3, and thus the character scanning is carried out. When the fourth stage 124 of the stage counter 120 is in the set state, the AND circuit 164 is excited by the timing pulse T2 to cause the contents of end register 43 to pass through the AND circuit 22 and be supplied to the adder-subtractor 30 via the OR circuit 25. The AND circuit 164 sends a subtraction signal to the circuit 30 through the OR circuit 170 whereby a subtraction is performed on the contents of the X-address register 41 and the end register 43 for the purpose of comparison between the two contents in terms of value. When the contents of the X-address register 41 reach the value of the end register 42 during the character scanning, this indicates the termination of the scanning.

The invention has been described above in connection with a particular example wherein the reference mark is disposed on the document to be scanned. Instead of this reference mark, an edge or a corner of the document may be scanned and detected in the form of video signal. This makes it possible to correct the error due to the positional deviation in stopping the document in a similar manner to the control using the reference mark.

An example wherein the character field is scanned in the positive X-direction has been described above. While the scanning in the positive Y-direction is made in the following manner. The fourth format data on the character field is equal to the value corresponding to the Y-coordinate of the character scanning end point. Then, this value and the contents of the Y-reference register 52 are added together at the instant this fourth format data is supplied. The summed result is stored in the end register 43. Then, in the scanning operation, the computation is performed with respect to the Y-address register. For the scanning in the negative direction, a subtraction is performed on the contents of the address register and the scanning pitch, instead of performing an adding operation on them.

The tilt correction according to the invention will be described below. In a case where the reference mark and the tilt mark are scanned, no tilt correction is made, the tilt correction is needed only when the character field is scanned. This is because the tilt register is reset by the start pulse and is not set until the end of the detection of the tilt mark.

Figure 10:
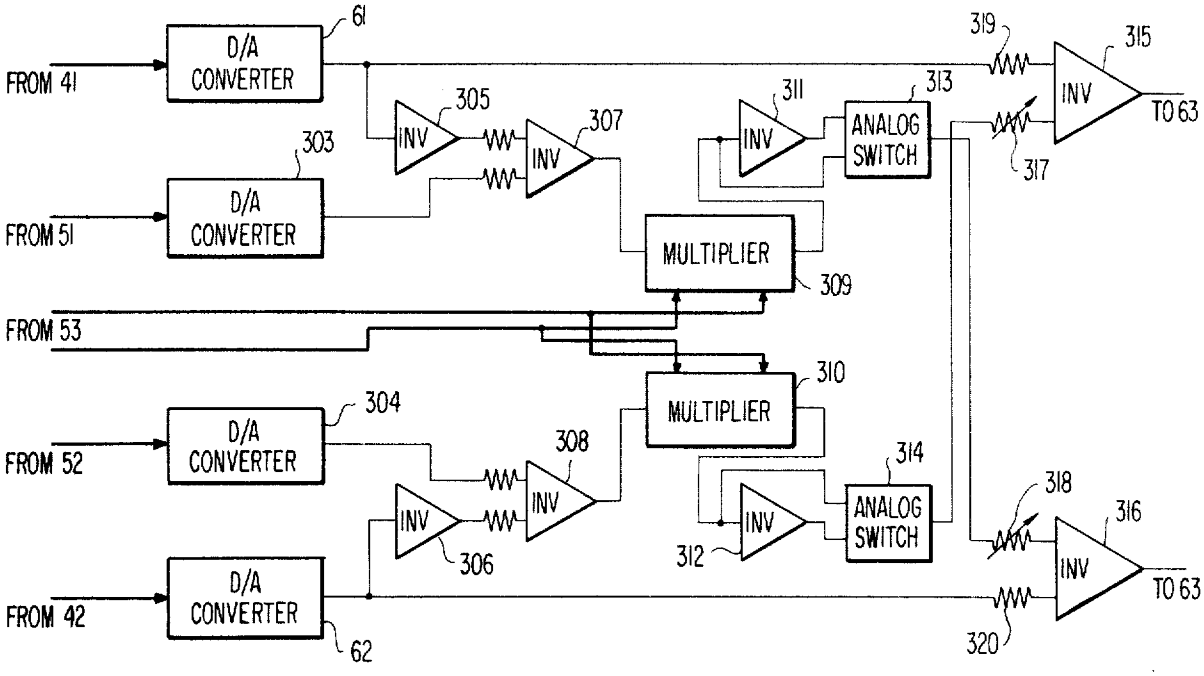
FIG. 10 shows a diagram of a tilt correction circuit of the invention.

An example of the analog tilt-correction circuit will be described by referring to FIG. 10.

The X-address signal from the X-address register 41 is converted into an analog signal, which indicates the X-address, by the digitalanalog converter 61. The digital signal indicating the X-coordinate of the reference mark from the X-reference register 51 is converted into an analog signal by a digital-analog converter 303. The signal from the converter 61 is inverted by an analog inverter circuit 305 and then added to the signal from the converter 303 in the ratio of 1 to 1. The resultant signal is derived from an analog summing inverter 307.

The signal from the inverter 307 is converted by an analog multiplier 309 into a signal proportional to the value of the digital signal indicating the tilt of the document from the tilt register 53. The signal from the multiplier 309 and its inverted signal are applied to an analog switch 313 whereby the signals are switched according to the signal from the register 53 indicating whether the direction of tilt is positive (clockwise rotation) or negative (counterclockwise rotation), and the signal indicating whether or not the distance between the reference mark and the tilt mark is half. When the direction of tilt is positive, the signal from the analog multiplier 309 is selected, while when it is negative, the signal from an analog inverter 311 is selected. The selected signal is used as the Y-direction deflecting signal correction signal added to the Y-address signal by an analog inverter 316. The analog switch 313 operates so that its output signal is doubled when the distance between the reference mark and the tilt mark is half the ordinary value. In consideration of various sources of error, the greater the distance between the reference mark and the tilt mark, the higher will be the accuracy in the measurement of the tilt. For a document of small size, however, this distance cannot be made large enough. This distance may be changed according to the size of the document to be scanned. This, however, necessitates a sophisticated circuit arrangement, and also, its effect is small. Furthermore, if this arrangement is provided, it is likely to introduce an additional error into the analog circuit. For these reasons, the invention adopts the arrangement dependent on the half distance between the reference mark and the tilt mark in this example. The Y-address signal from the Y-address register 42 and the Y-coordinate signal of the reference mark from the Y-reference register 52 are computed in analog form by the digital-analog converters 62 and 304, analog inverters 306 and 308, the analog multiplier 310, and an analog inverter 312 in similar manner to the operation for the X-direction. The analog switch 314, as opposed to the analog switch 13, selects the signal from the analog multiplier 310 when the tilt is negative, or the signal from the analog inverter 312 when the tilt is positive. The selected signal is added as the X-direction deflecting signal correction signal, to the X-address signal by an analog inverter 315. The correction values for the X- and Y-direction signals are comparatively small and hence, variable resistors 317 and 318 have fairly large resistance values in contrast to resistors 319 and 320. These variable resistors permit fine adjustment on the correction values.

Figure 11:
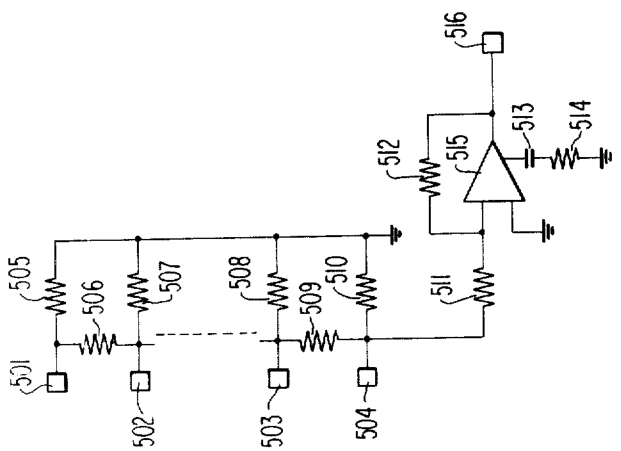
FIG. 11 shows a diagram of a digital-analog converter circuit of FIGS. 1 and 10.

The operations of the digital-analog converters 61, 303, 304 and 62 will be described below by referring to FIG. 11.

Binary signals of registers of least significant bit to most significant bit are connected to terminals 501, 502, 503, and 504 in the ascending order. The network comprising resistors 505 to 510 is a ladder type digital-analog converter which, in general, is realized by having resistors 507 and 508 with resistance values double those of resistors 505, 506, 509 and 510. A numeral 515 denotes an operational amplifier, for which, for example, NEC's (Nippon Electric Company, Ltd.'s) integrated circuit (μPC53) may be used. The amplification factor of an operational amplifier 515 depends on the ratio of resistances 512 and 511. The digital-to-analog conversion signal is delivered from a terminal 516. Capacitor 513 and resistor 514 form an RC circuit for preventing oscillation. In this example, the output at 516 from the operational amplifier is a signal with a polarity inverse to the signal of the ladder circuit. Accordingly, the analog inverter circuits 305, 306, 307, 308, 311, 315 and 316 are basically the same as comprising elements 511 through 516 shown in FIG. 11. The least significant bit of the digital-analog converters 61 and 62 corresponds to a coordinate value of about 0.02 mm. on the document, while it is sufficient that the least significant bit of the analog converters 303 and 304 corresponds to a coordinate value of about 0.5 mm. on the document. For this reason, the size of the ladder circuit may be half to one-third of that of the former. This is because a small amount of shift of the entire field will not affect the recognition, as opposed to the operation of field scanning wherein the recognition becomes impossible when the uniformity of scanning is disturbed.

Figure 12:
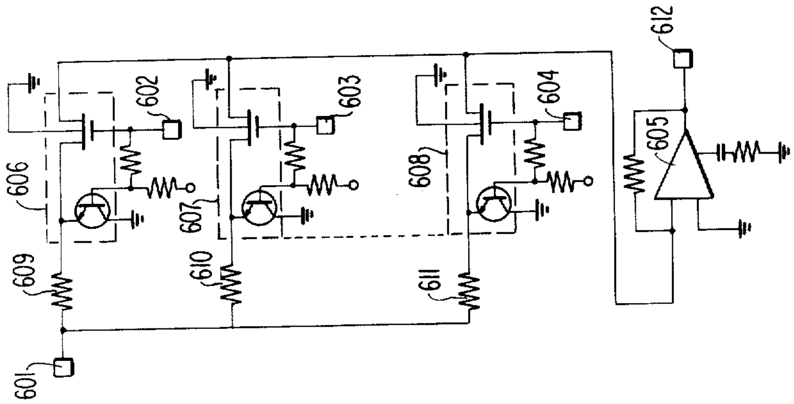
FIG. 12 shows a diagram of an analog multiplier in FIG. 10.

The operations of the analog multipliers 309 and 310 will be described below by referring to FIG. 12.

The signals supplied from the analog inverters 307 and 308 come in a terminal 601. Binary signals of most significant bit to least significant bit of the tilt registers are applied to terminals 602 through 604 in that order. Numerals 606 to 608 denote analog switches. When, for example, NEC's integrated circuit (μPC92) is used, two analog switch circuits are incorporated in one IC. When the binary signals applied to the terminals 602 through 604 from the tilt register 53 are a logical value of 1, a signal from the input terminal 601 is applied to an operational amplifier 605 through resistors 609 to 611. If the resistance value of the resistor 609 is R, the resistance value of other resistors 610 to 611 are made to be 2R, 4R, 8R, 16R....which are the powers of 2. As a result, the output of the operational amplifier is a signal such that the signal from the input terminal 601 is multiplied by the binary value of the tilt register 53 and then its polarity is inverted.

Figure 13:
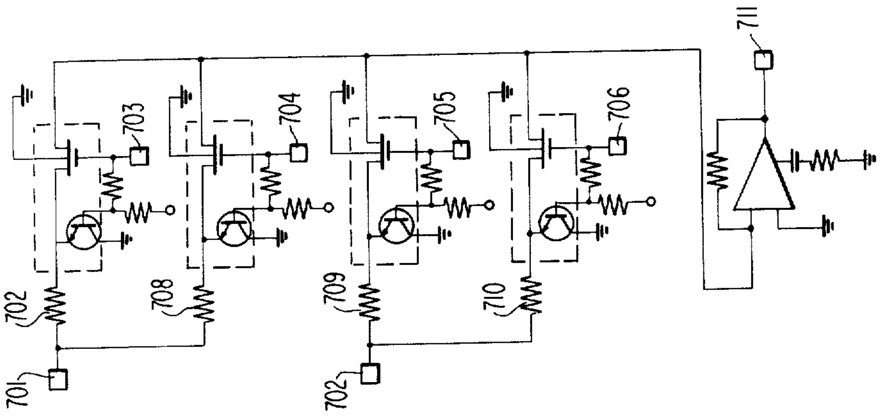
FIG. 13 shows a diagram of an analog switch circuit in FIG. 10.

The operations of the analog switches 313 and 314 will be described below by referring to FIG. 13.

In the analog switch 313, the signal from the analog multiplier 309 is connected to an input terminal 701, and the signal from the analog inverter circuit 11 is connected to an input terminal 702. When the tilt of the tilt register is positive, a terminal 703 stands at logical 1 and when it is negative, a terminal 705 stands at logical 1. When the distance between the reference mark and the tilt mark is half, terminals 704 and 706 stand 1 depending on whether the polarity of the tilt is positive or negative. The resistance values of the resistors 701 through 710 are equal to each other. Therefore, when the polarity of the tilt is positive, a signal whose polarity is the same as that of the converter 61 appears at an output 711 of the operational amplifier. Also, when the polarity of the tilt is negative, a signal with an inverted polarity comes out at the output 711. If the distance between the reference mark and the tilt mark is half, a doubled signal appears at the output 711. In the analog switch 314, the signal from the analog multiplier 310 is connected to the input terminal 702, and the signal from the analog inverter circuit 312 is connected to the input terminal 701. Otherwise, the circuit arrangement is the same as in the switch 313. Thus, when the polarity of the tilt is positive, a signal whose polarity is reverse to that of the digital-analog converter 62 appears at the output 711 of the operational amplifier. On the other hand, when it is negative, a signal whose polarity is identical thereto appears at the output 711.

An example of the analog tilt-correction circuit has been described in detail. It is apparent that the invention is not limited to this embodiment. For example, the distance between the reference mark and the tilt mark may be provided in one or three or even more kinds, instead of two as illustrated above. The polarity of the tilt (clockwise or counterclockwise rotation) may be determined so that the reference of tilt is set at a point where the document is rotated a certain angle counterclockwise, and the angle of clockwise rotation from the reference point is measured. The circuit arrangement may be simplified depending on the method of measurement. According to the invention, part of the analog circuit used in the foregoing embodiment may be replaced with suitable digital circuits or with other analog circuits.

While there has been shown and described but one embodiment of the invention, it will be understood by those skilled in the art that various modifications and alternatives may be made within the scope of the invention defined by appended claims.

We claim:

1. A document scanning apparatus comprising:

means for receiving control data such as positional data including a scanning position coordinate used for scanning information on a document, and storing the control data as present positional data for scanning the document, said means for storing the control data including an X-address register and a Y-address register for storing X and Y coordinate positional data;

means for scanning information on the document according to said present positional data;

arithmetic means responsive to said means for scanning for periodically adding or subtracting a fixed quantity from the contents of said X-address register until the X-coordinate of said reference mark is detected and for periodically adding or subtracting a fixed quantity from the contents of said Y-address register until the Y-coordinate of said reference mark is detected;

means for storing as a detected positional data the present positional data used when the reference mark is detected, said means for storing the detected positional data including an X-reference register and a Y-reference register for storing X and Y present coordinate positional data, said data being transferred into said X-reference register and said Y-reference register upon the detection of the X-coordinate and the Y-coordinate, respectively, of said reference mark; and means for correcting the document stopping position error depending on the detection of said reference mark to carry out the document scanning.

2. A document scanning apparatus as recited in claim 1 further comprising:

means for detecting through said scanning operation a tilt mark provided at a location on the document horizontally aligned with said reference mark;

a tilt register, said arithmetic means periodically adding or subtracting a fixed quantity from the contents of said Y-address register until the Y-coordinate of said tilt mark is detected, said arithmetic means thereafter subtracting the contents of said Y-reference register from the contents of said Y-address register and storing the result in said tilt register;

means for computing a vector difference between the scanning position coordinate and the reference mark coordinate;

means for multiplying said vector difference by the tilt of the document to obtain a tilt correction value; and means to vectorially add said tilt correction value to the scanning position coordinate thereby correcting the scanning position according to the tilt of the document.

3. A document scanning apparatus as recited in claim 2 wherein said means for storing the control data further comprises: an end register for storing the data of the coordinate of the maximum scanning allowable position, said arithmetic means periodically comparing the contents of said X-address register and the contents of said Y-address register, respectively, with the contents of said end register to produce an end of scanning signal when an equality is detected.

4. A document scanning apparatus as recited in claim 2 further comprising: first, second, third, and fourth digital-to-analog converters, respectively, connected to the outputs of said X-address, X-reference, Y-address, and Y-reference registers and providing analog output signals proportional to the contents of said registers, said means for computing a vector difference including a first analog inverter connected to receive the output of said first analog-to-digital converter, a second analog inverter connected to receive the outputs of said first analog inverter and said second analog-to-digital converter, a third analog inverter connected to receive the output of said third analog-to-digital converter, and a fourth analog inverter connected to receive the outputs of said third analog inverter and said fourth analog-to-digital converter.

5. A document scanning apparatus as recited in claim 4 wherein said means for multiplying includes a first analog multiplier connected to receive the outputs of said second analog inverter and the contents of said tilt register to convert the signal from said second analog inverter to a signal proportional to the contents of said tilt register, and a second analog multiplier connected to receive the outputs of said fourth analog inverter and the contents of said tilt register to convert the signal from said fourth analog inverter to a signal proportional to the contents of said tilt register.

6. A document scanning apparatus as recited in claim 5 wherein said means to vectorially add includes a fifth analog inverter connected to receive the outputs of said first analog-to-digital converter and said second analog multiplier to produce an X-address signal for said means for scanning, and a sixth analog inverter connected to receive the outputs of said third analog-to-digital converter and said first analog multiplier to produce a Y-address signal for said means for scanning.

7. A document scanning apparatus as recited in claim 6 wherein said means for scanning includes a cathode-ray tube and drive circuit means responsive to said X-address signal and said Y-address signal for scanning said document with a scanning beam, and wherein said means detecting includes a photodetector means positioned to sense the reflection of said scanning beam from said document, said photodetector means supplying a signal discriminated as either black or white to said arithmetic means for controlling said periodic adding or subtracting of a fixed quantity from the contents of said X-address register or said Y-address register.

* * * * *